United States Patent
Zeytoonian

[11] 3,908,119
[45] Sept. 23, 1975

[54] INSPECTION DEVICES

[76] Inventor: Nerses J. Zeytoonian, 202 Temple Rd., Waltham, Mass. 02154

[22] Filed: June 10, 1974

[21] Appl. No.: 477,646

[52] U.S. Cl. .............................. 240/4.2; 240/6.45
[51] Int. Cl.² .................................. F21V 33/00
[58] Field of Search .......... 240/4.2, 6.45, 2 R, 6.4 R

[56] References Cited
UNITED STATES PATENTS

| | | | |
|---|---|---|---|
| 2,466,454 | 4/1949 | Logan | 240/4.2 |
| 2,843,730 | 7/1958 | Schwartz | 240/4.2 X |
| 3,211,903 | 10/1965 | McElreath | 240/4.2 |
| 3,320,414 | 5/1967 | Bowland | 240/4.2 |
| 3,761,705 | 9/1973 | Fleming | 240/4.2 |

*Primary Examiner*—Richard L. Moses

[57] ABSTRACT

Inspection devices have mirrors and prefocussed lamps so combined that the light axis is at such an angle relative to the plane of the mirror that the light beam or beams may be directed to a surface to be inspected without subjecting the eyes of the observer to the direct glare of the lamp. The inspection devices may be of several types with a pocketbook vanity mirror, a vanity mirror attachable to an automobile visor and an inspection mirror being the disclosed embodiments.

8 Claims, 12 Drawing Figures

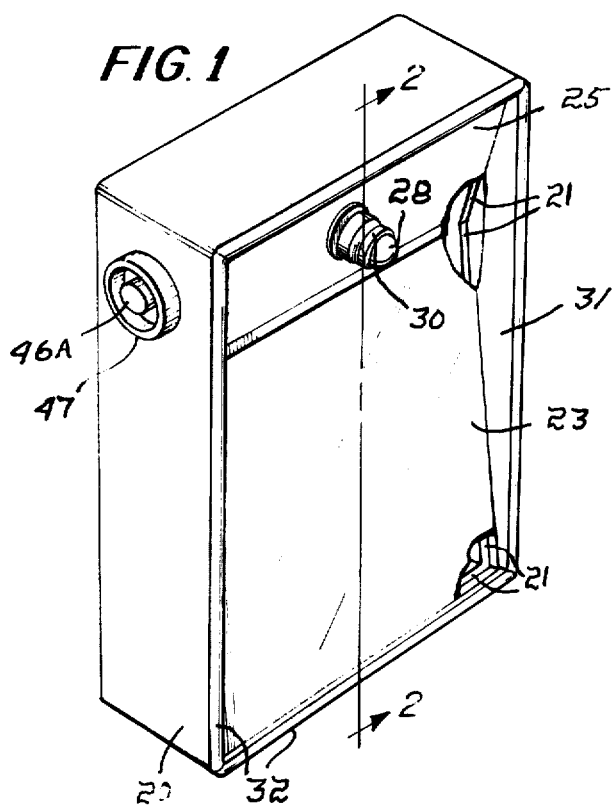
FIG. 1
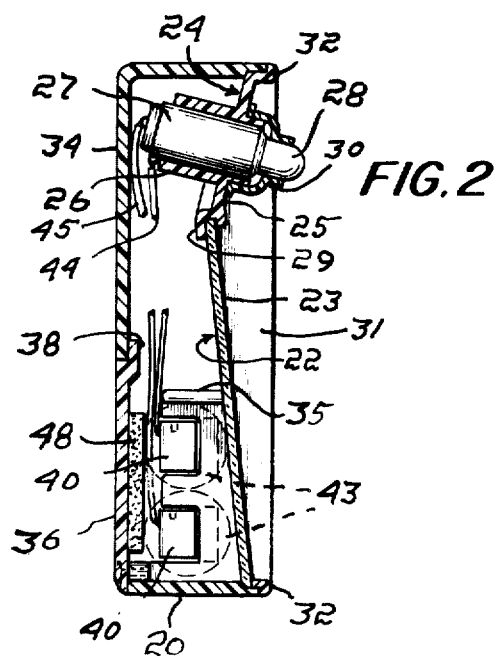
FIG. 2
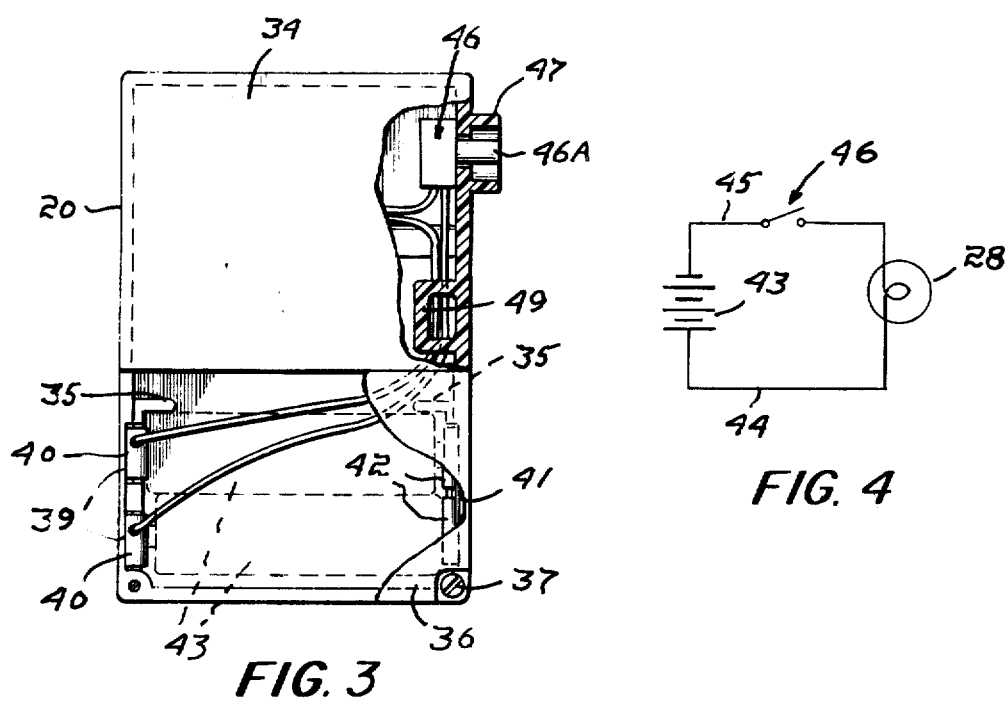
FIG. 3
FIG. 4

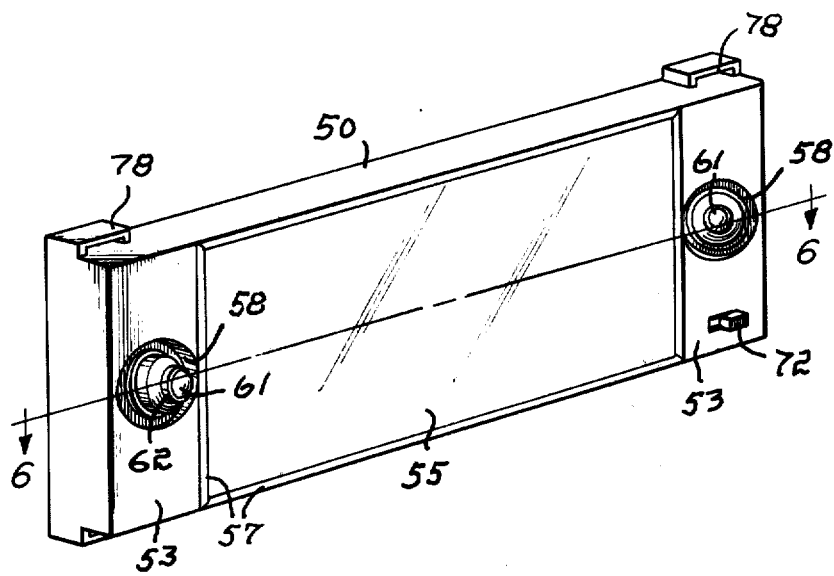
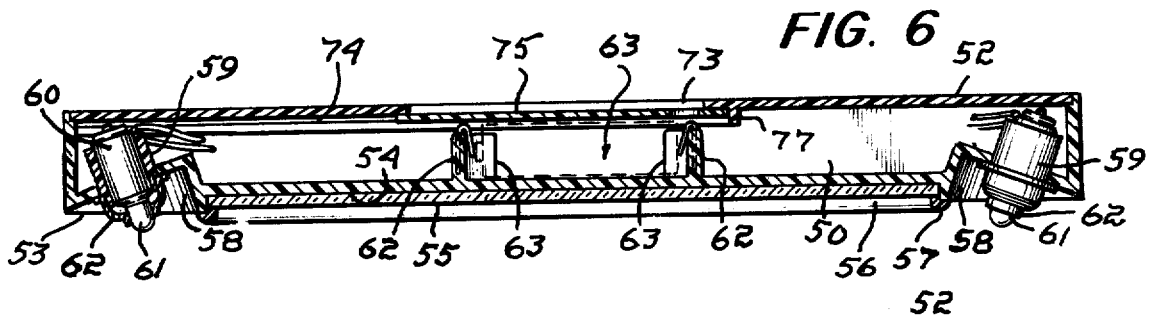
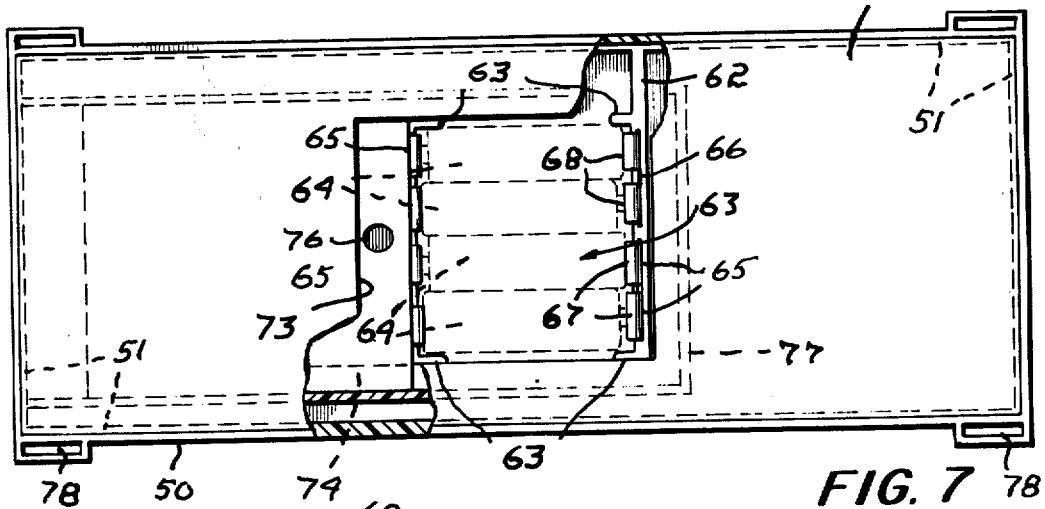
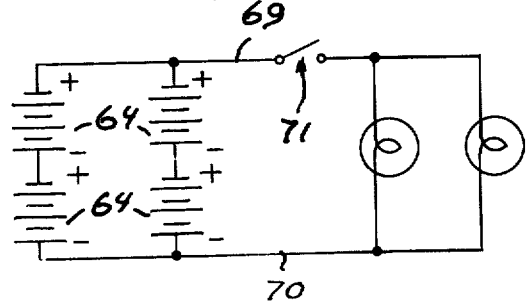

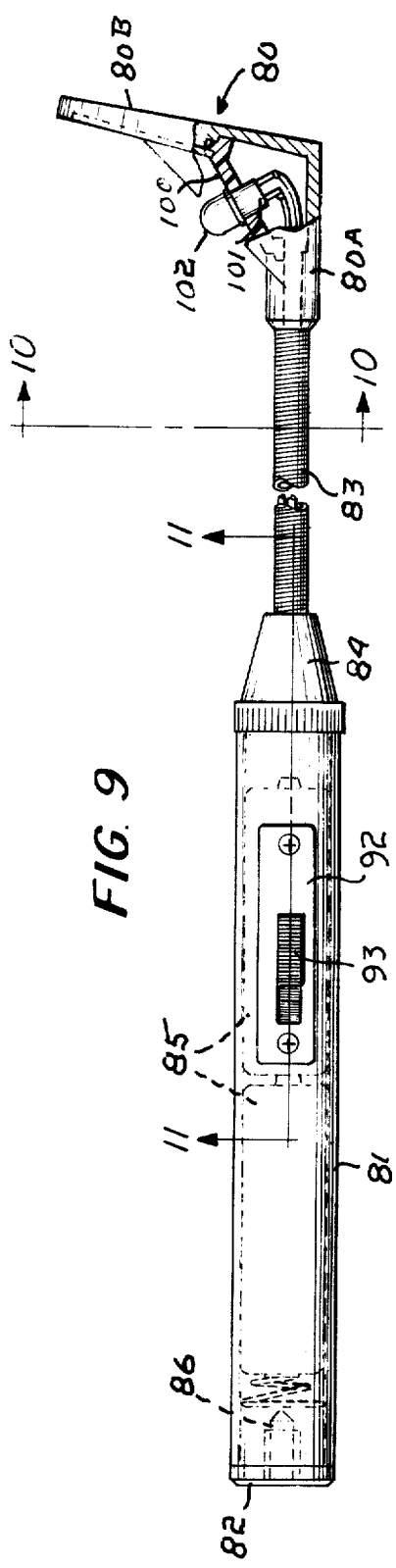
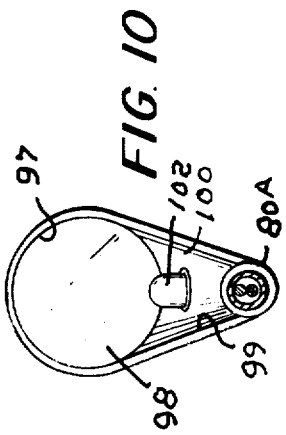
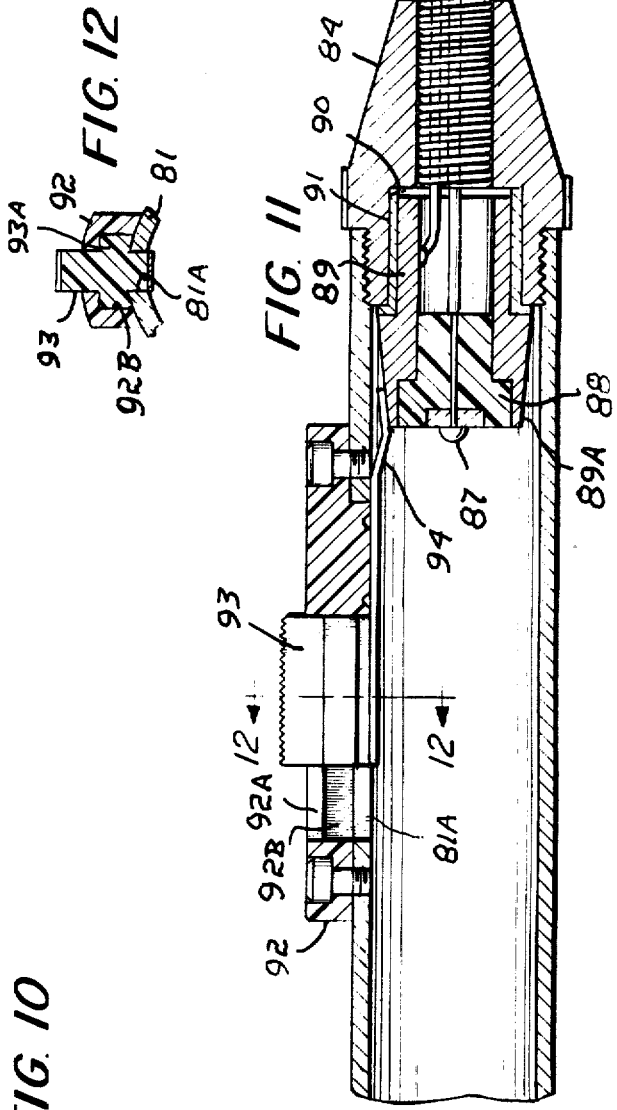

INSPECTION DEVICES

BACKGROUND REFERENCES

U.S. Pat. No. 3,217,154
U.S. Pat. No. 2,834,872
U.S. Pat. No. 2,224,257
U.S. Pat. No. 2,621,282
U.S. Pat. No. 2,120,238
U.S. Pat. No. 1,907,314

BACKGROUND OF THE INVENTION

Mirrors with means to illuminate them in the absence of adequate ambient light have been proposed for use, for one example, in the application of cosmetics including those incorporated in vanity cases and those of a larger size and provided with means attachable to a visor of an automobile and, for another example, special mirrors for inspecting interiors that are otherwise difficult to examine. Such proposals have not provided for adequate illumination without subjecting the eyes of the observer to the direct glare of the lamp.

THE PRESENT INVENTION

The general objective of the present invention is to provide inspection devices of various sizes and types provided with mirrors and lamps with the observer able to examine an area that is adequately illuminated without having his eyes subjected to the glare of the lamp or lamps used to illuminate the selected area.

In accordance with the invention, this general objective is attained by the provision of an inspection device having a support to which a mirror and at least one socket for a lamp of the prefocussed type are attached with the socket or sockets arranged to provide that, in use, the light beam or path of each prefocussed lamp is transversely of the mirror and at such an acute angle relative thereto that the observer may inspect an area illuminated directly by the lamp or lamps without subjecting his eyes directly to the glare thereof.

A particular objective of the invention is to provide inspection devices, hereinafter referred to as vanity mirrors and mounted in cases with or without covers and with or without cosmetics and applicators, the cases being of a size such that, like conventional vanity cases, they may be conveniently carried in pockets and handbags and conveniently hand held in use.

Another particular objective of the invention is to provide an inspection device that is attachable to a visor of an automobile for use as a vanity mirror, an objective attained with a support having a mirror located between two prefocused lamps, each mounted with its light axis or beam disposed towards the other across the mirror at an acute angle relative thereto.

Yet another objective of the invention is to provide an inspection device that may be used to inspect interiors that are otherwise difficult to examine, the interior of television and radio sets for examples, an objective attained by providing that the support includes a head to which the mirror and the prefocused lamp are secured with the light axis of the lamp transversely of the mirror and at an acute angle relative thereto, a handle with an intermediate flexible section, the handle having a battery chamber, desirably with the lamp leads within the flexible section.

BRIEF DESCRIPTION OF THE DRAWINGS

In the accompanying drawings, preferred embodiments of the invention are illustrated and FIG. 1 is a front perspective view of an inspection device of a vanity size;

FIG. 2 is a section taken approximately along the indicated line 2—2 of FIG. 1;

FIG. 3 is a partly sectioned view of the back of the device with the back and the detachable cover partly broken away;

FIG. 4 is a schematic view of the lamp circuit;

FIG. 5 is a front perspective view of an inspection device of a size appropriate for attachment to an automobile visor and provided with two prefocused lamps, one at each end of the mirror, with their light axes inclined towards each other and lengthwise of the mirror;

FIG. 6 is a section, on an increase in scale, taken approximately along the indicated line 6—6 of FIG. 5;

FIG. 7 is a view of the device as seen from the back with the cover in its open position and the back partly broken away;

FIG. 8 is a schematic view of the circuit;

FIG. 9 is a view of a device for use in inspecting interiors;

FIG. 10 is a section taken approximately along the indicated line 10—10 of FIG. 9;

FIG. 11 is a section, on an increase in scale, taken approximately along the indicated line 11—11 of FIG. 9; and FIG. 12 is a section taken approximately along the indicated line 12—12 of FIG. 11.

In the embodiment of the invention illustrated by FIGS. 1 - 4, a case 20 has an open front having an internal marginal shoulder 21 establishing a seat generally indicated at 22 in FIG. 2 for the flat mirror 23 and a seat, generally indicated at 24 for a panel or plate 25 have a rearwardly extending, centrally located open-ended sleeve 26 in which is secured the socket 27 holding a prefocused lamp 28. A panel 25 is shown as having an outwardly disposed rim 29 concentric with the sleeve 26 and centering a shield 30, desirably of rubber or a soft plastic. The shield 30 is cemented in place and is dimensioned to so encase the lamp 28 that only its tip is exposed.

It will be noted that the shoulder 21, where it extends along the sides of the case 20, is downwardly inclined from each end of the case to provide that the seats 22 and 24 are of unequal length and disposed in an obtuse angular relationship, the longer seat 22 for the mirror 23 and the shorter seat 24 for the panel 25. A frame 31 is dimensioned to fit within the case 20 against the seat 24 and to hold the margins of the mirror against the seat 22 and has a bezel 32 overlying the edges of the case 20. The frame 31 is bonded to the case and desirably includes the panel 25 as an integral part and the panel has a channel 33 receiving and supporting the proximate end of the mirror 23. With the mirror 23 and the plate 25 secured to their seats, the light axis of the lamp 28 is at a predetermined acute angular relationship relative to and extends transversely of the mirror 23.

The case 20 is shown as having an integral back 34 extending from its lamp and substantially beyond the junction between the seats 22 and 24 and terminates short of inwardly disposed shoulders 35 with which the sides of the case are provided. A cover 36 seated against the edges of the back of the case 20, is detachably secured thereto as by screws 37 and has a flange 38 underlying the proximate edge of the back 34.

In the area under the cover 36 and at the sides thereof, the shoulder 21 is shown as somewhat thicker than elsewhere and, at one side of the case, it has a pair of slots 39, each to hold one arm of a V-shaped resilient contact 40 and, at the opposite side, a single, longer slot 41 for the common arm of V-shaped, resilient contacts 42.

The space under the mirror 23 between the shoulders 35 and the proximate end of the case 20 is dimensioned to receive two batteries 43 of the type often referred-to as penlight batteries and these are arranged as shown in FIG. 3 in a reversed relationship, as is conventional, with both in electrical contact with the contact 42 and each in contact with an appropriate one of the contacts 40. One contact 40 has a lead 44 connected to the lamp socket 27 and the other contact 40 has a lead 45 soldered to the base of the lamp 28. One of said leads is provided with a switch 46, conveniently, a normally open switch. Such a switch has an operating stem 46A shown as exposed within an annular guard 47 integral with a side wall of the casing 20 and so protecting the stem 46A that, while it may be digitally engaged, the device may be carried in a pocket or handbag without the switch being accidentally actuated. Desirably, the removable cover 36 is provided with a foam pad 48 seated against the batteries 43 to secure them in place with a cushioning effect and desirably, one wall of the case 20 has a wire guide 49.

In practice and assuming inadequate ambient light when the mirror is to be used in facial inspection, the lamp 28 is turned on and directed, for example, to a facial area to determine whether cosmetics need to be applied. Because of the relationship between the mirror 23 and the lamp 28, the eyes of the user are not subjected to the direct glare from the prefocused lamp. It will also be appreciated that the device is well adapted for use as a flashlight.

The embodiment of the invention illustrated in FIGS. 5–8 is particularly adapted for attachment to an automobile windshield visor, not shown, and is for much the same use as the embodiment of the invention just described. A case includes a frame 50 having an internal marginal shoulder 51 extending along its back edges and providing a seat for and to which the back 52 is secured. The front of the frame 50 includes end panels 53 and an intermediate seat 54 for the flat mirror 55 and a frame 56 holds the mirror in place with the frame having a bezel 57 bonded to the base marginally of the seat 54.

Each panel 53 has a circular recess 58 in support of a holder 59 for a socket 60 for a prefocused lamp 61 and it will be noted that the axes of the recesses 58 and holders 59 and, accordingly, the light axes of the lamps 61 are inclined towards each other across the mirror 55 to define an acute angle between it and the light axis of each lamp 61. Each holder 59 has a lamp shield 62 cemented thereto and leaving the tip of the lamp 61 exposed.

The frame 50 has a pair of parallel, spaced walls 62 spaced from each other and from the ends of the frame with each wall 62 having a pair of shoulders 63 spaced from each other and the sides of the frame and disposed towards the other wall 62 thus to define a chamber for a series of four batteries 64, shown as of the penlight type. The walls 62 have a series of three spaced, lengthwise slots, two slots 65 and one relatively long slot 66. The series of slots of one wall 62 being reversed with respect to the series of slots of the other wall. Each of the slots 65 receives one leg of a V-shaped resilient electrical contact 67 while each slot 66 receives a leg common to a contact 68. The batteries are conventionally arranged in pairs with the batteries of each pair reversed. One contact 66 of each pair is in a lead 69 to which the two sockets 60 are connected in parallel while the other contact 66 of each pair is in a lead 70 to which the lamps 61 are connected in parallel. One lead includes a switch 71 having a slidable actuator 72 exposed through a slot in one of the panels 53.

The back 52 has a central opening 73 overlying the battery chamber and underlying bordering side channels 74 opening towards each other to provide tracks extending to one end of the back 52 for a sliding cover 75 having a finger grip 76. The back 52 has an underlying transverse stop 77 engageable when the cover 75 is in its closed position.

While the vanity mirror just described can be secured to a visor in various ways, it is shown as having top and bottom slotted tabs 78 at each end for securing the ends of elasticized bands, not shown, as a preferred means of attachment.

While a vanity mirror supported by a visor is not as easily used as a hand held one, its relatively larger size and its two lamps, together with the adjustability that the visor affords enable facial inspection to be effectively made without subjecting the eyes of the observer to the direct glare of the lamps.

The embodiment of the invention illustrated by FIGS. 9 – 12, is an inspection device particularly adapted for such purposes as the examination of the interiors of television or like sets or other interiors where parts that must be inspected cannot be viewed without at least the partial disassembly of a unit.

The inspection device of FIGS. 9 – 12 includes a head 80, a tubular handle or barrel 81 having an end cap 82 threaded in its rear end and a flexible tubular section 83 connected to the head 80 and to a ferrule 84 threaded in the front end of the handle 81.

The handle 81 houses a pair of penlight batteries 85, arranged in end-to-end contact lengthwise thereof with the end cap 82 having a spring 86 in contact with one battery end and forcing the opposite terminal of the other battery into engagement with a contact 87 in insulation 88 fitted in a contact 89. The inner end of the ferrule 84 has a socket 90 for the contact 89 and an interposed insulator 91 with the exposed inner end 89A of the contact 89 being rearwardly and inwardly tapered. The handle 81 has a slot 81A in registry with a slot 92A in a housing 92 attached to the handle 81 and having laterally opposed chambers 92B slidably holding lengthwise ribs 93A with which an actuator 93 is provided and which extends through the slots 81A and 92 and includes a contact 94 engageable with the contact portion 89A when the actuator 93 is slid forwardly to the appropriate extent. A lead 95 connected to the contact 89 extends forwardly through the tubular section 83 to the head 80 as does a lead 96 connected to the contact 87.

The head 80 includes a tubular portion 80A in which an end of the tubular portion 83 is secured and a holder portion 80B disposed at an angle slightly greater than 90° relative to the tubular portion 80A and having a seat 97 to which a mirror 98 is secured. Preferably the head 80 is molded from a flexible plastic enabling the mirror 98 to be a snap-fit in its seat. Between the mirror 98 and the tubular portion 80A, the holder 80 has a seat 99 to which a panel 100 is secured. The leads 95 and 96 extend into the head 80 and under the panel 100 and are conventionally connected to a socket 101 in support of a lamp 102 of the prefocused type and secured in the panel 100. It will be noted that the panel 100 is so disposed that the light axis of the lamp 102 defines an acute angle with the mirror 98 to enable a workman to locate the lamp 102 so that it directly illuminates a particular part and to examine that part in the mirror without subjecting his eyes to the direct glare of the lamp. It will be appreciated that the flexible section 83 enables the devices to be arranged as shown or with the section 83 curved so that the head may be passed in back of obstacles.

I claim:

1. An inspection device comprising a case dimensioned to be hand held and to be carried in pockets and handbags, the front of said case open and including an internal shoulder defining seats inclined downwardly towards each other, a mirror secured to one seat, a panel secured to the other seat and including at least one lamp socket and a lamp of the prefocused type in said socket, the socket adjacent one end of the mirror and so disposed relative thereto that the light beam for the lamp is disposed across the mirror and defines such an acute angle relative to the plane thereof that in the inspection in the mirror of an area directly illuminated by the lamp, the eyes of the observer are not subjected to the direct glare of the lamp, said case including a back defining with the mirror and the panel a chamber, a battery circuit within said chamber and including the socket and a lamp contact, a switch including an actuator extending through said case for manual engagement and battery contacts in the chamber and under said mirror.

2. The inspection device of claim 1 in which the area of the mirror is substantially greater than that of the socket panel and the socket panel includes a shoulder underlying and supporting the proximate edge of the mirror.

3. The inspection device of claim 2 in which a frame includes the panel and a portion overlying margins of the mirror and secured to the case to hold the mirror against its seat, the front edge of the panel also including a bezel overlying the proximate edge of the mirror and the frame has a bezel overlying and seated against the edges of the case.

4. The inspection device of claim 1 in which the panel includes an open-ended sleeve extending inwardly into the chamber, and the lamp socket is secured in the sleeve.

5. The inspection device of claim 1 in which the case is rectangular and the sides of the case include inwardly disposed shoulders under the mirror defining with the proximate end of the case a battery receiver, the battery contacts are secured to said sides within the receiver, and the back of the case includes a removable section overlying said receiver.

6. An inspection device comprising a case including a back and front and end panels, a planar mirror between said panels and supported thereby and by the sides of the case, each end panel has a recess whose axis is inclined towards the other end panel, a lamp socket secured in each recess, a lamp of the prefocused type in each socket, each socket so disposed relative to the other that the light beam therefrom is disposed across the mirror and towards said other lamp and defines such an acute angle relative to the plane thereof that in the inspection in the mirror of an area directly illuminated by the lamps, the eyes of the observer are not subject to the direct glare of the lamps, and said device including a battery circuit including the lamps and their sockets, battery contacts and a switch.

7. The inspection device of claim 6 and a lamp shield secured to each panel and enclosing the lamp carried thereby except for its tip.

8. The inspection device of claim 6 and a pair of parallel walls intersect the sides of the case and are spaced from each other and from the ends of the case, each wall includes a pair of shoulders spaced lengthwise thereof, each shoulder of one wall transversely aligned with the corresponding shoulder of the other shoulders, such shoulders and the walls between the shoulders defining a battery receiver.

* * * * *